H. H. Elwell.

Reversible Knob Latch.

No. 4,126.

Reissued Sept. 20, 1870.

Witnesses:

Wm. E. Lyon

Geo. B. Livingston

Inventor:

Henry H. Elwell

Munn & Co. Attorneys

N. PETERS, PHOTO-LITHOGRAPHER, WASHINGTON, D. C.

United States Patent Office.

HENRY H. ELWELL, OF SOUTH NORWALK, ASSIGNOR, THROUGH MESNE ASSIGNMENTS, TO THE RUSSELL AND ERWIN MANUFACTURING COMPANY, OF NEW BRITAIN, CONNECTICUT.

*Letters Patent No.* 53,526, *dated March* 27, 1866; *reissue No.* 4,126, *dated September* 20, 1870.

IMPROVEMENT IN REVERSIBLE KNOB-LATCHES.

The Schedule referred to in these Letters Patent and making part of the same.

*To all whom it may concern:*

Be it known that I, HENRY H. ELWELL, of Norwalk, in the county of Fairfield and State of Connecticut, have invented a new and useful Improvement in Locks; and I do hereby declare that the following is a full, clear, and exact description thereof, which will enable those skilled in the art to make and use the same, reference being had to the accompanying drawing forming part of this specification, in which—

Similar letters of reference indicate corresponding parts.

This invention relates to a new and useful improvement in locks which are provided with reversible slide-latches, to admit of their being applied to either a right or left-hand door, as may be required.

The invention consists—

First, in a novel means for connecting the tail of the latch to the lever operated by the knob-spindle by which the latch is worked, whereby the latch can be reversed without being disconnected from such mechanism; and Secondly, in the employment of a movable stop set in the lock-case, in combination with a fixed stop on the latch tail and a swivel-joint reversible latch, whereby a limitation is given to the forward movement of the latch-head when the latch is adjusted for use, but which can be removed when it is desired that the latch should be free to be reversed in position.

A represents the lock-case, which may be constructed of rectangular or other form, and provided internally with a lever, B, having two arms, *a a'*, against one of which, *a*, the arms *b b* of a hub, C, on the knob-arbor, work.

The lower end of the arm *a'* of the lever B has a notch or recess, *c*, and a socket, *d*, at one side, the latter receiving the end of the latch-tail D, which is of circular form, as shown at *e*.

A neck, *f*, formed by notches or recesses, *g g*, in the top and bottom edges of the latch-tail, fits into the recess *c* in the arm *a'* of the lever B, forming substantially a swivel-joint connection between the latch-tail and the mechanism which works it.

By this arrangment a secure connection is formed between the slide-latch and the arm *a'* of the lever B, so that when the latter is operated through the medium of the hub on the knob-arbor the latch-head may be drawn within the lock-case.

It is quite obvious that unless some device be interposed to prevent the squared part of the latch-head from being drawn so far forward as to bring the cylindrical portion, *k*, into the mortise in the lock front plate, it will be easy to reverse the latch-head in position, at pleasure.

The latch-tail has a fixed pin or stop, *i*, projecting from each side of it, and within the case there is fitted a sliding stop, E, the upper end of which projects through the lock-case, so that it may be operated by the hand.

This slide is fitted in a guide, F, and it has a spring, *j*, at one side of it, which is also fitted within the guide, and prevents the slide from casually moving or dropping when raised.

Figure 1:
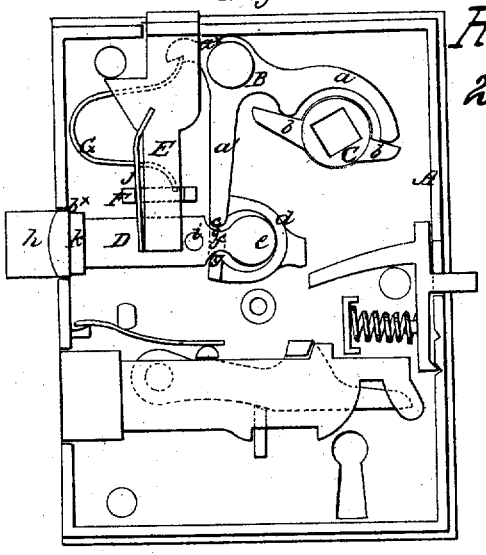
Figure 1 is an internal view of a lock having my improvement applied to it.

This slide works over the slide-latch, and assists to keep it in position or prevent it from turning, and the pin *i*, at the outer side of the slide-latch, is kept in contact with the slide when the latter is down by means of a spring, G, which bears against a projection, $a^{\times}$, at the upper end of the lever B, (see fig. 1.)

Figure 2:
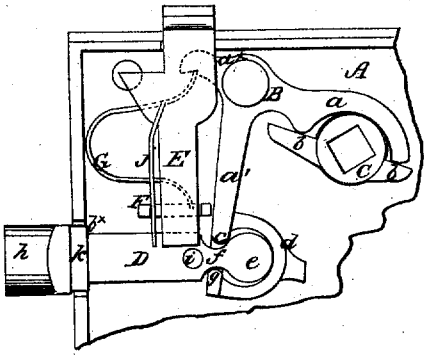
Figure 2 is also an internal view of a portion of the same, showing a different position of the parts constituting my invention, and the other parts which are internally connected therewith.
Figure 3:
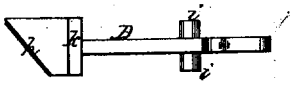
Figure 3 is a detached top or under view of the slide-latch.

In order to turn the latch-tail and reverse the latch-head in position to suit a right or left-hand door, the slide E is raised so that its lower end will be above the pin *i*, and the spring G immediately throws the slide-latch out sufficiently far to cause the cylindrical portion *k*, just back of the square of the head, to pass into the opening $b^{\times}$, (see fig. 2,) and the slide-latch may then be turned, and, when turned, shoved a trifle inward or backward, so that the slide E may be restored to position in front of the pin *i*, and limit the extent of forward movement of the latch-tail.

The arrangement is an exceedingly simple one, and admits of the latch-head being turned or reversed in position with the greatest facility.

Having thus described my invention,

I claim as new, and desire to secure by Letters Patent—

1. The connecting of the latch-tail D with the arm *a'* of the lever B, by means of the recess *c* and socket *d* of said arm, and the circular end *e* of the slide-latch, and the notches or recesses *g g*, in the top and bottom edges of the same, forming a swivel-joint, substantially as shown and described.

2. The combination, with a swivel-joint reversible latch, D, of a movable stop, E, set in the lock-case, and a fixed stop, *i*, on the latch-tail, substantially as described, for the purposes specified.

3. The cylindrical collar *k*, on the slide-latch, in combination with the pins *i* and the slide E. substantially as and for the purpose set forth.

Witnesses: HENRY H. ELWELL.

DAVID E. DISBROW,

LEVERETT S. CURTISS.